E. D. WOODS.
INTERMITTENT OPERATING MECHANISM.
APPLICATION FILED AUG. 23, 1916.
1,296,726.
Patented Mar. 11, 1919.
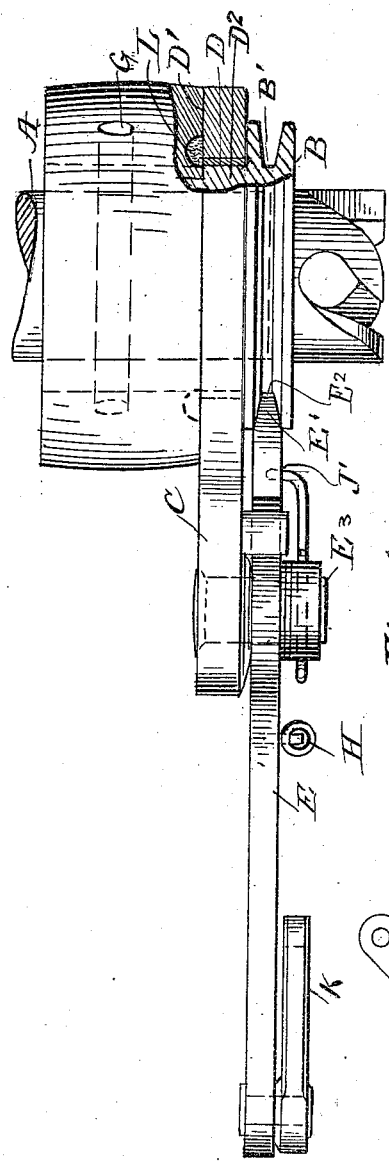
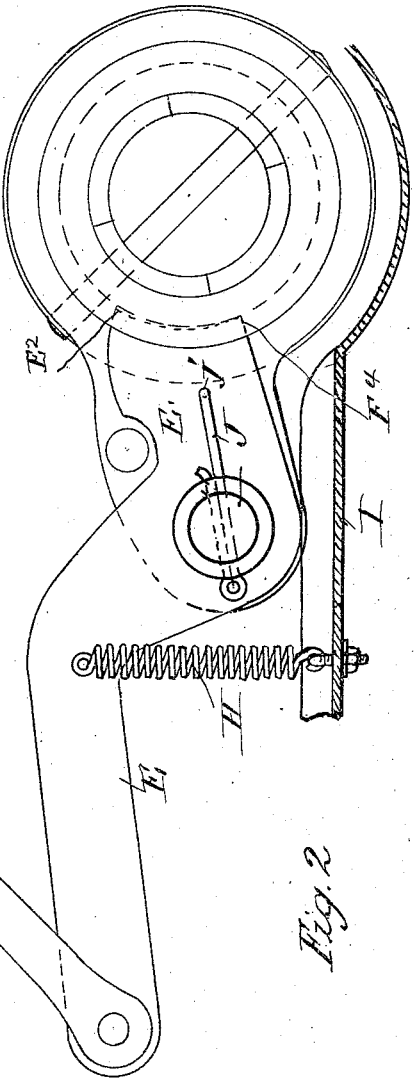
Inventor
Edward D. Woods
by Wm H. Monroe
Attorney

UNITED STATES PATENT OFFICE.

EDWARD D. WOODS, OF CLEVELAND, OHIO, ASSIGNOR, BY DIRECT AND MESNE ASSIGNMENTS, TO WOODS STEEL & PROCESS CORPORATION, OF BOSTON, MASSACHUSETTS, A CORPORATION OF MASSACHUSETTS.

INTERMITTENT OPERATING MECHANISM.

1,296,726.  Specification of Letters Patent.  Patented Mar. 11, 1919.

Application filed August 23, 1916. Serial No. 116,430.

*To all whom it may concern:*

Be it known that I, EDWARD D. WOODS, a citizen of the United States, and resident of Cleveland, in the county of Cuyahoga and State of Ohio, have invented certain new and useful Improvements in Intermittent Operating Mechanism, of which I hereby declare the following to be a full, clear, and exact description, such as will enable others skilled in the art to which it appertains to make and use the same.

The objects of the invention are to provide an improved form of lever operated gripping device or clutch operating from an intermediate or neutral position to engage with a rotatable member and impart movement instantaneously thereto in either direction at the option of the user.

It is adapted to universal use as a power appliance to take the place of intermitting gears or of a pawl and ratchet device. It can also be used as a starting device for the explosion engine of a gasolene driven motor car.

The invention is illustrated in the accompanying drawings and hereinafter more fully described and specified in the claim.

In the accompanying drawings Figure 1 is a side elevation of the device; Fig. 2 is a plan view thereof.

In these views A is an engine shaft, B is an annular clutch member thereon, having a V shaped groove B' in its periphery. Closely adjoining this clutch member is shown the arm C sleeved over a cylindrical bearing $D^2$ upon the aforesaid clutch member B and having a common axis therewith.

A shoulder D is provided to retain the arm in position for the manner of use shown. This shoulder may be formed upon the end of the small pulley used to drive the fan of an automobile engine.

Pivoted upon this arm at E is shown the lever E' which is preferably angular in shape, and is provided with an engaging extremity having a conversely curved V shaped edge which makes gripping or frictional contact with the V shaped groove B' when the lever is moved in one direction.

To effect this result the engaging point $E^2$ is advanced so that the lever will make a strong frictional contact with the side of the groove and turn the shaft quickly.

Also the heel $F^4$ of the lever extremity is so placed as to prevent frictional contact in such a manner as to operate the clutch, when the lever is in the neutral position.

The parts of the clutch and shaft are secured together by means of a pin G. Means for lubricating the arm bearing is shown at L comprising an annular groove in the shoulder which is filled with a heavy lubricant.

In Fig. 2 the device is shown within the hood of a Ford automobile.

A spring H secured at one end of the frame or bottom I of the hood or pan therein returns the lever instantly and throws the same out of the operative engagement with the clutch groove when released and prevents engagement if the engine should backfire. Also a second spring J is shown mounted upon the arm at the pivotal point which engages the lever at J'.

This spring will prevent the point of the lever from moving the clutch forward in case the arm should strike against the bottom of the hood accidentally, which might easily occur when the machine is on the road, from sudden shocks and jolts. It will be seen that the spring J' is a direct connection between the working parts of the clutch itself and is not connected with the frame or other part of the machine.

In this manner there is no danger of the clutch engaging accidentally from back firing, or sudden revolution of the engine shaft from any cause, since the clutch members are automatically maintained out of engagement with each other and in the neutral position when not in use.

A link K pivoted upon the outer extremity of the lever is connected with any suitable chain or rod, conveniently operable from the driver's seat at the front of the machine.

The invention is simple, efficient and positive in action as a clutch for universal use, since it can be quickly operated in the manner described without accidental engagement of the parts.

Having described the invention what I claim as new and desire to secure by Letters Patent is:

In a clutch the combination with a shaft, a support thereon, a disk clutch member thereon, an arm pivoted on said shaft, a dog pivoted on said arm and provided with an operating lever, a spring connecting said lever and base and normally adapted to release said dog from contact with said disk member, and a supplemental spring attached at one end to said pivot for said dog and at the other end to said dog, to prevent accidental displacement of said dog.

In testimony whereof, I hereunto set my hand this 26th day of July 1916.

EDWARD D. WOODS.

In presence of—
WM. M. MONROE,
RALPH W. JEREMIAH.